April 18, 1967     A. F. COMMEYRAS     3,315,018
METHOD OF MAKING FOAMED PLASTIC CONTAINERS
Filed Nov. 26, 1963
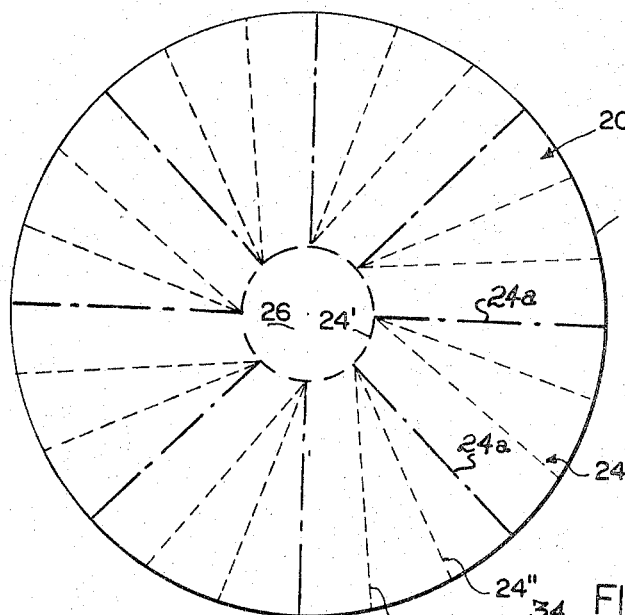
FIG. 1
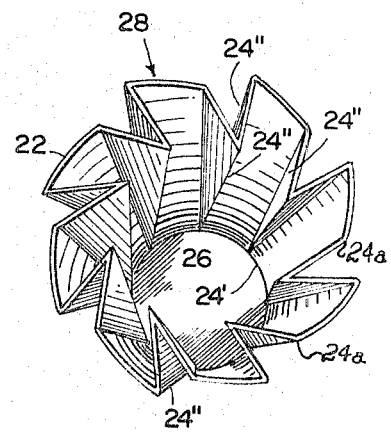
FIG. 2
FIG. 3
FIG. 4
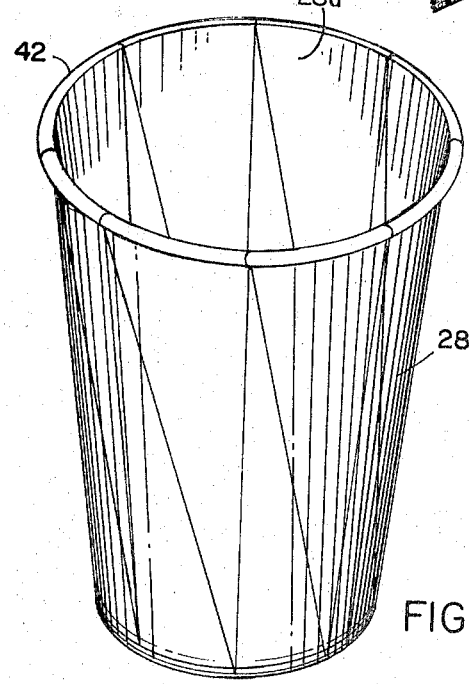
FIG. 6
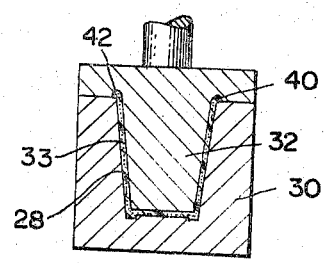
FIG. 5
INVENTOR.
ANDRÉ F. COMMEYRAS
BY
Ezekiel Wolf, Wolf & Greenfield
ATTORNEYS United States Patent Office 3,315,018
Patented Apr. 18, 1967

3,315,018
METHOD OF MAKING FOAMED PLASTIC CONTAINERS
André F. Commeyras, Concord, Mass., assignor to Sweetheart Plastics, Inc., Wilmington, Mass., a corporation of Maryland
Filed Nov. 26, 1963, Ser. No. 326,099
7 Claims. (Cl. 264—51)

This invention relates to the manufacture of disposable containers and more particularly comprises a new and improved method of making disposable containers from expansible plastic material.

Disposable plastic containers for food and drink have gained a substantial portion of the market which formerly used only containers made of paper. The greatest inroads made in this market by plastic containers have been in the line of cold food and drink containers, for very economical methods have been developed to draw thin plastic sheets into a variety of container shapes, and the cost of thermoformed or molded plastic containers is economically competitive with the cost of paper containers. In this special area, the containers made of plastic perform functionally at least as well as those made of paper, and because of the formability of the plastic they may be made in more decorative shapes. However, no completely satisfactory plastic containers have heretofore been devised for hot food and drink. Expandable bead molded cups have gained an appreciable portion of the over-the-counter hot cup market, but they have some serious limitations which inhibit their use. First, they have a wall thickness of 0.90″ and greater, and consequently nest very high. As a result they require substantial storage space and are relatively expensive to ship. Second, the beaded cups have some leakage problems, and are made at a slow production rate.

While no inexpensive insulated low nesting plastic container has heretofore been developed suitable for use with hot food and drink, the search has continued, because it is perfectly apparent to all having even a passing knowledge of the plastics art that a variety of plastics have many of the physical characteristics which make them inherently suited both functionally and artistically for this purpose. Cellular plastic materials such as thermoplastic foams are particularly well suited to provide the insulation required of containers for hot foods, and thermoplastic foams formed into a container may have sufficient strength to perform the intended function and withstand the normal abuses to which such containers are subjected. No economical method has heretofore been developed, however, to manufacture them in quantity. For example, the vacuum or pressure forming of foam sheet material is extremely difficult, and the knowledge acquired in the industry through the vacuum and pressure forming of thin-walled containers made of plastic has been of little assistance.

It has been apparent since the development of foam plastic material that good heat insulation may be obtained by providing the container made of that material with thick walls, but thick container walls cause a corresponding increase in the nesting height of a stack of such containers. It is essential that nesting height be small to achieve low shipping costs and large capacity per unit volume for warehousing and storage.

One important object of this invention is to provide an economical method of mass producing throw-away plastic containers suitable for hot food and drink.

Another important object of this invention is to provide a method of producing a container made of foamed plastic, having good heat insulating and strength properties and a limited thickness.

Another important object of this invention is to provide a method of producing a disposable container having side walls which have good heat insulating properties and a normal upward and outward flare, and which stack in a low nest.

Yet another important object of this invention is to provide a method of making a container which allows for the control of waste by precutting the blanks with minimum of scrap and the reprocessing of the scrap, and allows the blanks to be shipped at minimum cost to other areas for fabrication into cups without waste.

In accordance with this invention a blank is cut in an expansible thermoplastic sheet material, which blank may be folded, overlapped or otherwise made to assume the container shape. The blank is shaped in a die cavity, and thereafter while in the cavity pressure is applied to the multi-ply portions to compress them somewhat. While the thickness of the container walls is being controlled in the cavity, heat is applied to the material to bond the overlapped portions of the sheets together and expand the thinner sections of the wall so that their thickness becomes equal to the thickness available in the closed cavity. If the closed cavity space thickness is uniform, the thinner sections will acquire a thickness equal to the multi-ply sections.

These and other objects and features of this invention along with its incident advantages will be better understood and appreciated from the following detailed description of a preferred embodiment thereof, selected for purposes of illustration and shown in the accompanying drawing, in which:

FIG. 1 is a plan view of a container blank made of expansible thermoplastic sheet material, with broken lines suggesting an arrangement of scored lines to facilitate folding the blank into the shape of a container;

FIG. 2 is a perspective view of the blank shown in FIG. 1, partially folded;

FIG. 3 is an enlarged fragmentary cross-sectional view of the container wall before being processed in accordance with this invention;

FIG. 4 is a fragmentary cross-sectional view of the container wall after being processed in accordance with this invention;

FIG. 5 is a diagrammatic view suggesting the method of processing the blank of FIGS. 1 and 2 to form a useable container;

FIG. 6 is a perspective view of a finished container constructed from the blanks of FIGS. 1 and 2 and made in accordance with this invention.

The method of this invention will be described in connection with the manufacture of drinking cups, but it is to be understood that the invention is not in any way confined to the fabrication of those specific articles.

In FIG. 1 a blank 20 is shown made of heat expandable thermoplastic material. The blank 20 is punched or otherwise formed in the sheet by severing its peripheral edge 22, and simultaneously the blank may be scored along the lines 24 to facilitate folding of the blank in the manner begun in FIG. 2. The edge 22 of the blank may not be exactly round so as to compensate for the folds subsequently provided in the side wall. By flattening the arcs between corresponding fold lines, the cup when formed will have a circular edge. The expandible thermoplastic sheet material may typically be extruded from thermoplastic polystyrene beads or pellet material such as "Dylite," manufactured by Koppers Company, and "Pellospan," manufactured by Dow Chemical Corp., or from prepared pellets in which suitable blowing agents such as pentane have been dispersed. The beads or pellets when heated to fusible temperatures individually expand and unite with each other to form a contiguous rigid unicellular structure. When extruded in sheet form the sheet may again be rendered thermoplastic at which time the material again expands. It is to be understood that other expandible materials may be used.

The circular scored line 24' formed at the center of the blank 20 defines the bottom wall 26 of the cup made from the blank while the scored lines 24'' allow the side wall 28 to be formed by folding pleats in the blank, which extend generally radially from a scored line 24' to the periphery 22. The orientation of the scored lines 24 and the folding of the blank as suggested in FIG. 2 to form a container do not per se constitute this invention. This general scheme is used in the paper industry in the fabrication of one-piece paper cups. An alternate arrangement of scored lines may not include lines 24a particularly if the stock thickness is not great. It will be noted in FIG. 2 that fold line 24a is not necessary in the formation of the cup.

A cup made from a blank of the general design shown in FIGS 1 and 2 has several advantages, one of the most important being the absence of any seams which may leak if not properly sealed. With other arrangements such as multi-blank cups, care must be taken to firmly seal the seams in the container side and bottom walls for obviously the very first prerequisite for acceptability is that the product be leak-proof.

In accordance with the present invention, after the blank 20 is cut from the larger sheet it is folded and placed in the closed mold having a female die 30 and a male plug 32. As the male moves downwardly as viewed in FIG. 3, the folds on the scored lines are severely creased to fully shape the container, and ultimately the thickness of the cavity 33 which houses the blank in the dies is reduced in width to less than the total thickness of the multi-ply sections of the side walls. Typically, this sheet material may be approximately 0.025 inch and the cavity in the mold may be approximately 0.060 inch. Thus the three-ply section 34 of FIG. 3 will be reduced from 0.075 inch to 0.060 inch when the mold is closed. The thickness of the single play section 36 remains 0.025 inch until the next step in the process is conducted.

While compression of the multi-ply portion of the container presses the plies 34a, 34b and 34c tightly together, the absence of some agent to induce adherence of the pleated portions together, will cause the blank to return to the shape shown in FIG. 2 when the blank is removed from the dies. Thus, it is essential to provide some agent which causes the several plies of a multi-ply section 34 to bond permanently together.

One of the problems inherent in the use of a foamed material is the lack of strength of such material, particularly in relatively thin sections. Another disadvantage of this material is the irregular textured character of the surfaces of such material. Because surfaces are not uniform, containers made from the material lack the richness in appearance of paper containers for the same use, and can in certain instances appear to be unfinished. Further, while the foam material inherently has good heat insulating properties, in thin sections the insulation is not sufficient to allow a container made of that material to be handled comfortably when filled with hot liquid.

In order to increase the strength and heat insulating properties of the material, enhance the appearance of the cup, and form a permanent bond between the overlapped portions of the blank, heat is applied to the blank in the cavity. As described above, the multi-ply sections 34 of the side wall 28 are somewhat compressed. After the wall has been compressed and while the limited thickness is maintained by the dies 30 and 32, heat is applied to the material which causes the material in the single ply sections 36 to expand and fill the cavity and achieve the thickness of the multi-ply sections 34. Because the cavity 33 permits less than free expansion of the material, the surfaces of the dies which define the cavity develop a smooth surface on the material both in the single ply and multi-ply sections to achieve a finished appearance for the cup. The strength and heat insulating characteristics of the container wall also experience a marked increase due to the expansion of the single ply sections. The added thickness and accompanying reduction in the density as the portions 36 provide the container with the insulating properties necessary to enable it to be handled comfortably when filled with hot liquid while the more dense multi-ply portions 34 may provide spaced sections of greater strength. The same application of heat also serves to bond the several plies 34a, 34b and 34c together in face-to-face relationship as shown in FIG. 4 and thus the cup assumes the permanent form shown in FIG. 6.

The heating of the plastic material may be achieved in a number of different ways. For example, infrared heaters may be imbedded in the male and/or female die to direct heat to the walls of the cup. Alternatively, steam passages may be provided in one and/or the other of the molds to direct steam through the walls of the cup. As yet another alternative, dielectric heaters may be imbedded in the molds to electronically heat the thermoplastic material.

Because the cup is free of seams which may leak if not fused together, it is unnecessary to heat the plastic material to its melting temperature so as to achieve fusion of the several plies 34a, 34b and 34c with an accompanying loss of the interface between them. In accordance with the present invention the plastic material need be heated only to approximately 212° F. The combination of the pressure generated by the expanding gases in the cells of the plastic material and the heat cause the several folds or plies to bond together. The bond is of sufficient strength to maintain the shape of the container but is not necessarily of a character adequate to close a seam. If it was necessary to close a seam, it would be necessary to maintain the cavities in the molds sealed to achieve higher pressures and temperatures. Thus, in the practice of this invention the heating can be carried out at atmospheric temperatures while this is not possible in the manufacture of containers having fused seams.

After the heating is completed, the cup should be cooled in some way before opening the dies. Cooling of the material will cause the walls to harden so that they may be removed from the cavity of the dies without deformation or subsequent expansion. Like the heating step, cooling may be achieved in a number of ways such as by directing cooling water or forced air over or through the dies, or by ambient cooling. When cooled the dies may be opened and the cup may be removed.

In FIG. 5 the dies are shown to define a bead-shaped cavity 40 which shapes the rim 42 of the cup. It will be appreciated that if the bead-shaped cavity is larger than the thickness of the top edge of the cup, the heat applied to the material may cause the edge to expand and form the bead 42. This same phenomenon may be employed to specially shape certain parts of the side wall of the cup or achieve special textures other than that of a smooth polished satin-like finish. Further, a cover seat may be formed at the top of the side wall 28 on its interior surface 28a by providing an annular bead-shaped recess in the male die 32, which will cause a portion of the inner surface of the side wall to expand more than the remainder of the wall. Such shapes may be readily achieved merely by specially shaping the male and/or female dies.

Having described this invention in detail, those skilled in the art will appreciate the numerous modifications that may be made of it without departing from its spirit. Therefore, it is not intended to limit the breadth of this invention to the specific embodiment illustrated and described. Rather, it is intended that the scope of this invention be determined by the appended claims and their equivalents.

What is claimed is:

1. A method of making disposable plastic containers comprising the steps of
providing a blank made of expandible thermoplastic material,
overlapping seamless portions of the blank to shape it into a container in a mold,
compressing the mold about the shaped blank so that the thickness of the mold cavity is somewhat less than the original total thickness of the overlapping portions of the blank,
and thereafter, without changing the cavity size, heating the shaped container within the mold to bond the overlapped portions of the blank, permanently setting the blank in the container form, and expanding the portions of the container wall which are not overlapped.

2. A method as defined in claim 1 wherein said blank is a one-piece, seamless, substantially circular blank which forms both the side and bottom walls thereof.

3. A method of making articles of expandible thermoplastic sheet material comprising the steps of
cutting blanks from the material and assembling them into the articles by folding into overlapped seamless portions,
placing the assembled blanks in cavities of molds which prevent expansion of said overlapped seamless portions of the sheet material,
and while in said molds, heating the articles to expand other portions of the sheet material and form alternate density portions in said articles.

4. A method as defined in claim 3 further characterized by
assembling the articles by forming pleats in the blanks, and employing heat and pressure upon the blanks imparted by the cavities to bond the pleats in the blanks together.

5. A method of making a disposable plastic container comprising the steps of
providing a sheet of expandible thermoplastic material,
cutting from the sheet a substantially circular blank and scoring the blank with a circle at its central portion to define the bottom wall of the container and a plurality of generally radial lines extending from the circle to the edge of the blank to enable the portion of the sheet surrounding the circle to be pleated to define the side wall of the container,
folding and pleating the blank on the scored lines to shape the container,
placing the shaped container in a cavity of a mold which cavity does not exceed the thickness of the pleated portions of the blank,
and while the sheet is in the cavity applying heat to it to bond the pleats together to give the container a permanent shape and expand the non-pleated portions of the blank to make the thickness of said non-pleated portions substantially equal to the thickness of the pleated portions of the blank.

6. A method of making a foam plastic container comprising the steps of
providing a sheet of expandible plastic material,
cutting a one-piece blank from the sheet and forming a pleated and seamless container side wall from said blank having pleated and non-pleated portions,
and expanding the non-pleated portions of the side wall so that they equal the thickness of the pleated portions and simultaneously bonding the pleats together.

7. A method as defined in claim 6 further characterized by the expanding and bonding being accomplished by heating the plastic material to approximately 212° F.

References Cited by the Examiner

UNITED STATES PATENTS

| | | | |
|---|---|---|---|
| 2,368,085 | 1/1945 | Barbieri | 264—138 |
| 2,435,308 | 2/1948 | Harvey | 93—60 |
| 3,007,594 | 11/1961 | Wallace | 161—161 |
| 3,008,190 | 11/1961 | Mesinger | 264—138 |
| 3,069,725 | 12/1962 | Root | 264—51 |
| 3,085,730 | 4/1963 | Fibish | 229—1.5 |
| 3,126,139 | 3/1964 | Schechter | 229—1.5 |
| 3,128,029 | 4/1964 | Price et al. | 229—1.5 |
| 3,131,845 | 5/1964 | Sherlock et al. | 229—1.5 |
| 3,141,595 | 7/1964 | Edwards | 229—1.5 |
| 3,222,437 | 12/1965 | Schilling | 264—54 |
| 3,223,305 | 12/1965 | Edwards | 229—1.5 |
| 3,244,346 | 4/1966 | Tijunelis | 264—321 XR |

FOREIGN PATENTS 625,970  7/1949  Great Britain.

ALEXANDER H. BRODMERKEL, *Primary Examiner.*

ROBERT F. WHITE, FRANK L. GARRETT,
*Examiners.*

P. E. ANDERSON, V. A. TOMPSON,
*Assistant Examiners.*